3,159,553
METHOD OF SEPARATING METHANOL FROM A MIXTURE THEREOF WITH WATER, XYLENE, AND ESTERS
Harry J. Aroyan, San Rafael, Wilton H. Lind, Walnut Creek, and Roger T. Johnson, San Rafael, Calif., assignors to California Research Corporation, San Francisco, Calif., a corporation of Delaware
Filed Apr. 27, 1961, Ser. No. 106,023
2 Claims. (Cl. 202—40)

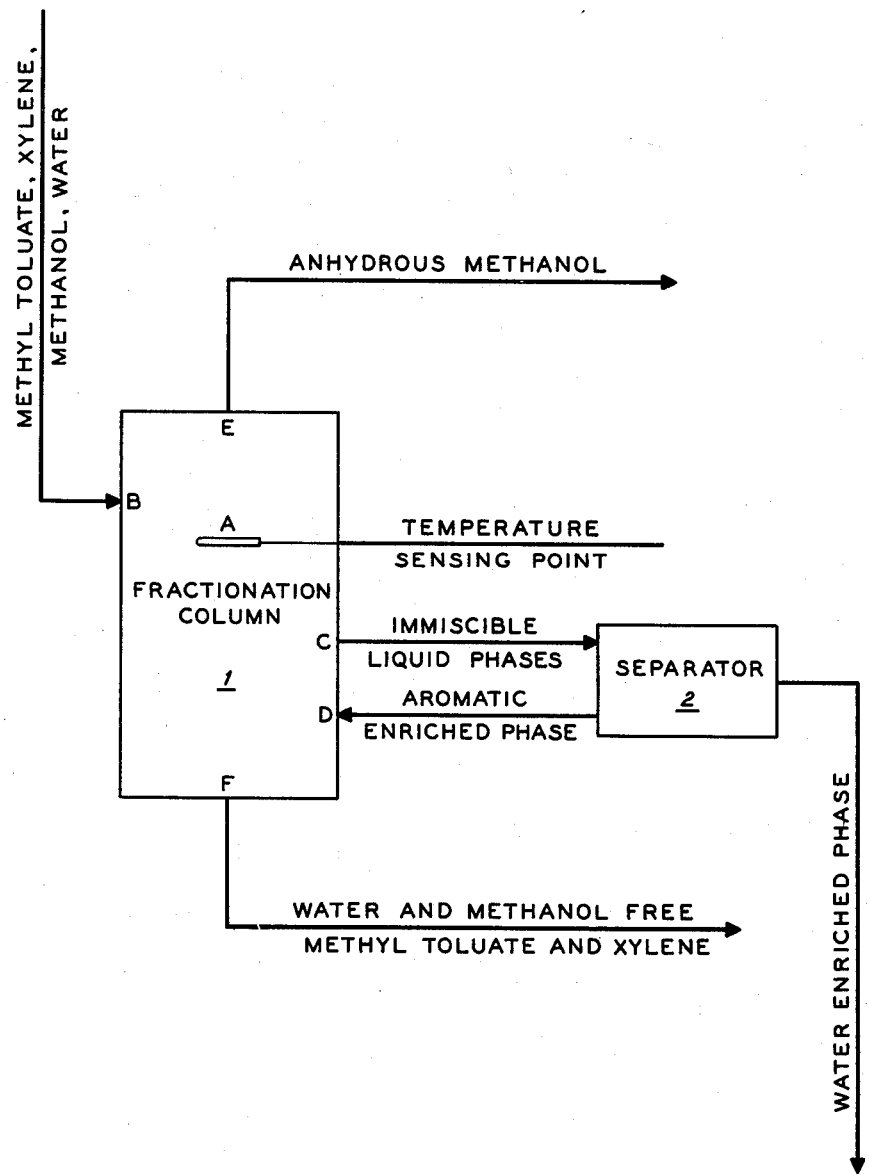

Certain processes for the preparation of dimethyl esters of phthalic acids by oxidation of xylene followed by esterification with methanol result in a crude product which is a mixture of xylene, methyl toluate, water, methanol, phthalic acid monomethyl esters, as well as phthalic acid dimethyl ester product. The remainder of the crude product is easily separated from the relatively heavy, high-boiling phthalic acid mono- and diesters by a simple fractionation, leaving a mixture which is substantially methanol, water, methyl toluate, and unreacted xylene.

From this crude mixture, it is desired to recover methanol for recycle to the esterifier which is substantially anhydrous. Water is a product of an esterification reaction, and hence the laws of mass action and chemical equilibria show that if water is returned to the esterifier with recycle methanol, the equilibrium is shifted against the esterification reaction.

Furthermore, any xylene and methyl toluate obtained from the process should be as water- and/or methanol-free as possible in order that they may be adaptable for further oxidation. It is well-known that substantial amounts of water and/or methanol tend to inhibit oxidation of aromatic compounds.

Conventionally, this mixture of methyl toluate, xylene, methanol, and water, along with minor amounts of other impurities such as light hydrocarbons, aldehydes, acids, etc., which may be present, is passed to a fractionation column where the methanol, water, and xylene are removed overhead, and substantially water-free methyl toluate is recovered as bottoms and returned for further oxidation. The methanol-water-xylene mixture is then passed to a second fractionation column, wherein substantially water-free methanol (with a small portion of the xylenes) is recovered overhead and recycled to the esterifier, and aqueous xylenes are removed as bottoms. Water removal from the xylenes may be accomplished by a simple phase separation, whereupon the xylenes may be recycled to the oxidizer. Thus, two complete fractionations and a phase separation are required to obtain a substantially anhydrous methanol fraction and a substantially water- and methanol-free methyl toluate and xylene fraction.

It has now been discovered that in only one simple operation a mixture comprising methanol, water, methyl toluate, and xylene, the weight ratio of xylene to methanol being at least 1:50, preferably at least 1:10, may be separated into a fraction comprising substantially anhydrous methanol and a fraction comprising substantially water- and methanol-free methyl toluate and xylene. According to the invention, the mixture comprising methanol, methyl toluate, water, and xylene is passed into a distillation zone wherein the temperature is maintained so as to form a methanol-enriched homogeneous liquid phase in an upper portion of said zone and two immiscible liquid phases in a lower portion of said zone, one phase being a water-enriched phase and the other being an aromatic-enriched phase, the aromatic-enriched phase containing relatively large amounts of xylene and methyl toluate. The two immiscible liquid phases are withdrawn from said lower portion of said zone, and the water-enriched phase is removed from the two immiscible phases. The aromatic-enriched phase is returned to the distillation zone and a substantially water- and methanol-free fraction comprising methyl toluate and xylene is removed from the lower portion of the distillation zone, while a fraction comprising substantially anhydrous methanol is recovered from the upper portion of the zone. By this invention, a separation which conventionally required two fractionations and a phase separation may now be accomplished in only one fractionation and a phase separation.

A minimum weight ratio of xylene to methanol of 1:50, preferably 1:10, has also been found necessary to obtain a good separation. With less than 1:50 weight ratio of xylene, the separation of the water-enriched phase from the aromatic-enriched phase becomes extremely difficult. The xylene may be any xylene isomer, preferably the meta or para isomers. Similarly, the methyl toluate may be various of its isomers, meta and para again being preferred.

Relatively small amounts (totalling up to 20 or even 25 percent of the mixture) of other compounds may also be tolerated in the mixture without adversely affecting the separation. Accordingly, various aldehydes, alkyl aromatic compounds, light hydrocarbons, etc., will often be found in esterification products. Where these materials boil in the methanol range, or close to it, they will usually be recovered along with the methanol. Since these materials, in the amounts generally encountered, are not a serious impediment to the methanol esterification, they may be recycled to the esterifier along with the methanol. Where these compounds are higher boiling, in the range of xylene or methyl toluate, they will be removed along with them. Depending upon the nature of these impurities, they may be removed or left with the mixture, as desired.

With a sufficient number of plates in the fractionating column, it is possible to recover an anhydrous methanol fraction which is essentially free of xylene. However, a small portion, up to about 3 to 5 mol percent, xylene in the anhydrous methanol returned to the esterifier is no hindrance to the esterification process as xylene is unaffected by esterification. Any xylene recycled to the esterifier with methanol and subsequently returned to the fractionation column merely tends to build up to an equilibrium concentration. Therefore, the column, is economically operated with less plates and a portion of the xylene coming overhead with the anyhdrous methanol.

In order to effect this separation and form the upper methanol-enriched homogeneous phase and the two immiscible liquid phases in the lower portion of the zone, it has been found that the temperature must be regulated at some point between where the feed enters the zone and a point, below the feed point, where the two immiscible phases are withdrawn. The temperature at the chosen point is between about 155° and 210° F., preferably 160°–190° F. A good separation cannot be achived if the temperature is below the boiling point of methanol or above the boiling point of water. Within this range, the actual temperature chosen will vary according to the location of the temperature measuring point, i.e., lower temperatures are suitable if this point is nearer the feed point. The temperature also varies with the composition of the feed. It has been found that higher temperatures are needed where the feed contains a higher ratio of methyl toluate to xylene. Of course, other points, not between the feed and the phase withdrawal point, could be selected as the temperature measuring point; the temperature required to obtain satisfactory separations, however, is then determined empirically, and may not necessarily fall within the range herein disclosed for the particular case described herein where the temperature is measured between the feed and phase withdrawal points.

A preferred embodiment of the invention may be more clearly understood by reference to the drawing. A mixture comprising methyl toluate, xylene, methanol, and water is passed into the fractionation column 1, described in this invention. The temperature in this column is measured at temperature sensing point A and is maintained between 155° and 210° F., preferably 160° to 190° F. It is noted that temperature sensing point A is between the feed point B and the withdrawal point C from which a heterogeneous mixture of a water-enriched phase and an aromatic-enriched phase is withdrawn. This heterogeneous mixture is passed to separator 2 and the two phases separated. The aromatic-enriched phase is returned to the fractionation column at point D and the water-enriched phase is disposed of. Substantially anhydrous methanol is removed from the fractionation column 1 at point E. A mixture of substantially water- and methanol-free methyl toluate and xylene is removed from the fractionation column at point F.

Depending on the composition of the feed, the water-enriched phase may be of lower specific gravity than the aromatic-enriched phase, or the reverse may be the case. In either event, the phase of lower specific gravity will be the upper of the two immiscible liquid phases in separator 2 and the other phase will be the lower. The separation is carried out in the same manner regardless of which phase is on top; however, in one case the upper phase is returned to the distillation column, and in the other case the lower phase is returned.

The actual working of the process of this invention may be understood by a reference to the following examples. However, these examples are merely illustrative of what is considered a preferred embodiment of the invention, and hence they are not to be construed as further limitations on the scope of the invention as hereinbefore described.

*Example 1*

A feed comprising 70.8 parts by weight methanol, 2.1 parts by weight water, 8.8 parts by weight p-xylene, 16.6 parts by weight methyl p-toluate, and 1.7 parts by weight other impurities was fed to the 20th tray of a 40-tray distillation column with a reflux ratio of about 2:1. The temperature at tray 15 was maintained at about 170° F., thus forming a heterogeneous system at tray 10. This two-phase mixture, having a water-enriched phase and an aromatic-enriched phase, was withdrawn from tray 10 and phase-separated. The aromatic-enriched phase was returned to the column.

After 15½ hours of continuous operation, the overhead withdrawn at about 152° F. was found to be substantially anhydrous methanol (less than ½ weight percent water) along with 7 weight percent p-xylene. The bottoms fraction was substantially water- and methanol-free methyl p-toluate (less than 0.1 weight percent water and less than 0.1 weight percent methanol) along with 15 weight percent p-xylene.

Using a tray 15 temperature of 165° F. and a reflux ratio of about 3½:1, both the overhead and the bottoms contained only about 0.1 percent water and the bottoms contained less than 0.1 percent methanol.

*Example 2*

A feed comprising 72.0 parts by weight methanol, 1.5 parts by weight water, 11.5 parts by weight p-xylene, 13.7 parts by weight methyl p-toluate, and 1.3 parts by weight other impurities was fed to tray 20 of a 40-tray distillation column with a reflux ratio of about 2:1. The temperature at tray 15 was maintained at about 163–165° F., thus forming a heterogeneous system at tray 10. This two-phase mixture, having a water-enriched phase and an aromatic-enriched phase, was withdrawn from tray 10 and phase-separated. The aromatic-enriched phase was returned to the column.

After 9 hours of continuous operation, the overhead withdrawn at 150–152° F. was found to be substantially anhydrous methanol (less than ½ weight percent water) along with 6.6 weight percent p-xylene. The bottoms fraction was substantially water- and methanol-free methyl p-toluate (less than 0.1 weight percent water and less than 0.1 weight percent methanol) along with 29.8 weight percent p-xylene.

As will be evident to those skilled in the art, various modifications on this process can be made or followed, in the light of the foregoing disclosure and discussion, without departing from the spirit or scope of the disclosure or from the scope of the following claims.

We claim:

1. A method of separating a fraction comprising substantially anhydrous methanol from a mixture comprising methanol, water, xylene, and methyl toluate, the weight ratio of said xylene to said methanol being at least 1:50, which comprises passing said mixture into a distillation zone; maintaining the temperature between about 155° and 210° F. at a point in said zone below the point where said mixture is passed into said zone and above a point where two immiscible liquid phases are withdrawn, thereby forming a methanol-enriched homogeneous liquid phase in an upper portion of said zone and two immiscible liquid phases in a lower portion of said zone, one of said phases being a water-enriched phase and the other being an aromatic-enriched phase; withdrawing said two immiscible liquid phases from said lower portion; removing said water-enriched phase from said two immiscible liquid phases; returning said aromatic-enriched phase to said zone; removing a substantially water- and methanol-free fraction comprising methyl toluate and xylene from the lower portion of said zone, while recovering a fraction comprising substantially anhydrous methanol from said upper portion.

2. A method of separating a fraction comprising substantially anhydrous methanol from a mixture comprising methanol, water, xylene, and methyl toluate, the weight ratio of said xylene to said methanol being at least 1:50, which comprises passing said mixture into a distillation zone; maintaining the temperature between about 160° and 190° F. at a point in said zone below the point where said mixture is passed into said zone and above a point where two immiscible liquid phases are withdrawn, thereby forming a methanol-enriched homogeneous liquid phase in an upper portion of said zone and two immiscible liquid phases in a lower portion of said zone, one of said phases being a water-enriched phase and the other being an aromatic-enriched phase; withdrawing said two immiscible liquid phases from said lower portion; removing said water-enriched phase from said two immiscible liquid phases; returning said aromatic-enriched phase to said zone; removing a substantially water- and methanol-free fraction comprising methyl toluate and xylene from the lower portion of said zone, while recovering a fraction comprising substantially anhydrous methanol from said upper portion.

References Cited in the file of this patent

UNITED STATES PATENTS

| | | |
|---|---|---|
| 2,148,846 | Von Retze et al. | Feb. 28, 1939 |
| 2,549,290 | Cougdon et al. | Apr. 17, 1951 |
| 2,638,440 | Drout et al. | May 12, 1953 |
| 3,103,470 | Wilson et al. | Sept. 10, 1963 |

FOREIGN PATENTS

| | | |
|---|---|---|
| 587,704 | Great Britain | May 2, 1947 |
| 922,798 | France | June 18, 1947 |